(12) United States Patent
Choi et al.

(10) Patent No.: US 12,577,148 B2
(45) Date of Patent: ***Mar. 17, 2026

(54) CERAMIC COMPOSITION COMPRISING ANTIMICROBIAL GLASS COMPOSITION

(71) Applicant: LG Electronics Inc., Seoul (KR)

(72) Inventors: Wongyu Choi, Seoul (KR); Daesung Kim, Seoul (KR); Young Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 329 days.

This patent is subject to a terminal disclaimer.

(21) Appl. No.: 17/965,209

(22) Filed: Oct. 13, 2022

(65) Prior Publication Data

US 2023/0114630 A1      Apr. 13, 2023

(30) Foreign Application Priority Data

Oct. 13, 2021     (KR) ........................ 10-2021-0136039

(51) Int. Cl.
| | |
|---|---|
| *A01N 59/14* | (2006.01) |
| *A01N 59/16* | (2006.01) |
| *A01N 59/26* | (2006.01) |
| *A01P 1/00* | (2006.01) |
| *A61P 1/00* | (2006.01) |
| *C03C 3/089* | (2006.01) |
| *C03C 3/097* | (2006.01) |
| *C03C 4/00* | (2006.01) |
| *C03C 8/02* | (2006.01) |
| *C03C 8/08* | (2006.01) |
| *C03C 8/18* | (2006.01) |

(52) U.S. Cl.
CPC ................ *C03C 8/18* (2013.01); *A01N 59/14* (2013.01); *A01N 59/16* (2013.01); *A01N 59/26* (2013.01); *A01P 1/00* (2021.08); *C03C 3/089* (2013.01); *C03C 3/097* (2013.01); *C03C 4/00* (2013.01); *C03C 8/02* (2013.01); *C03C 8/08* (2013.01); *C03C 2204/02* (2013.01); *C03C 2205/00* (2013.01)

(58) Field of Classification Search
CPC .... C03C 3/04; C03C 8/00; C03C 8/18; C03C 3/062; A01N 59/00
See application file for complete search history.

(56) References Cited

U.S. PATENT DOCUMENTS

| | | | | |
|---|---|---|---|---|
| 2006/0142413 A1* | 6/2006 | Zimmer | .................. | C03C 3/089 |
| | | | | 523/122 |
| 2017/0233287 A1* | 8/2017 | Li | ........................... | C03C 3/089 |
| | | | | 428/172 |
| 2019/0075800 A1 | 3/2019 | Campbell | | |
| 2023/0031976 A1 | 2/2023 | Kim et al. | | |
| 2023/0069627 A1 | 3/2023 | Kim et al. | | |

FOREIGN PATENT DOCUMENTS

| | | | | |
|---|---|---|---|---|
| CN | 113402172 A | * | 9/2021 | ............. C03B 32/02 |
| DE | 112020006192 | | 11/2022 | |
| JP | H9-263423 A | | 10/1997 | |
| JP | H09263423 A | * | 10/1997 | ............... C03C 8/22 |
| JP | 2005-255517 A | | 9/2005 | |
| JP | 2006-520311 A | | 9/2006 | |
| KR | 20190123570 | | 11/2019 | |
| WO | WO-2020167400 A1 | * | 8/2020 | ......... C03C 10/0054 |
| WO | WO 2021125801 | | 6/2021 | |
| WO | WO 2021125804 | | 6/2021 | |
| WO | WO 2022145821 | | 7/2022 | |

OTHER PUBLICATIONS

Evstropiev et al., "Antibacterial effect of nanostructured ZnO—SnO2 coatings: The role of microstructure", Materials Today Communications 21 (2019), 100628.*
Savvova, "Effect of zinc and tin oxides on the bactericidal properties of glass enamel coatings", Glass and Ceramics, vol. 71, Nos. 7-8, Nov. 2014. pp. 37-40.*
Extended Search Report in European Appln. No. 22200819.5, mailed on Mar. 9, 2023, 6 pages.
Office Action in Korean Appln. No. 1020210136039, mailed on Sep. 7, 2023, 8 pages (with English translation).

* cited by examiner

*Primary Examiner* — Ernst V Arnold
(74) *Attorney, Agent, or Firm* — Fish & Richardson P.C.

(57) ABSTRACT

A ceramic composition includes an antimicrobial glass composition that includes components harmless to the human body and maintains an antimicrobial function semi-permanently. Specifically, the ceramic composition includes a novel antimicrobial glass composition that includes a glass former $SiO_2$ as a main component, and ZnO and SnO as antimicrobial components.

8 Claims, No Drawings

CERAMIC COMPOSITION COMPRISING ANTIMICROBIAL GLASS COMPOSITION

CROSS-REFERENCE TO RELATED APPLICATION

This application claims priority to and the benefit of Korean Patent Application No. 10-2021-0136039, filed on Oct. 13, 2021, the disclosure of which is incorporated herein by reference in its entirety.

TECHNICAL FIELD

The present disclosure relates to a ceramic composition that comprises an antimicrobial glass composition to ensure improvement in antimicrobial performance.

BACKGROUND

Microorganisms such as germs, viruses and bacteria are found in all places, in particular, a washbasin, the shelves in a fridge or a washing machine that are used in our daily lives. If such microorganisms invade the human body, they can infect the human body and become a serious threat to human health.

Germs and viruses vary depending on environments. In particular, *Pseudomonas aeruginosa* thrives in a moist environment. *P. aeruginosa* can survive under environmental conditions with a minimal nutrient supply. Accordingly, *P. aeruginosa* is considered to be a ubiquitous bacterium. Additionally, the bacterium exists in humid environments, medical devices and even containers of disinfectant liquids in health care facilities, and forms a biofilm.

Under the circumstances, there is a growing demand for an antimicrobial glass composition capable of preventing the spread of microorganisms to the furniture, medical tools, a container for disinfectant liquids and the like in a hospital as well as a household product such as a washbasin, the shelves in a refrigerator, an oven, a washing machine and the like.

In particular, a ceramic composition such as an enamel needs to ensure durability, wear resistance and cleaning performance as well as antimicrobial performance. However, an antimicrobial glass composition of the related art cannot be applied to a ceramic composition such as an enamel since it provides antimicrobial performance only. Further, since the antimicrobial glass composition of the related art includes Ag, Cu, Zn and Bi, it is difficult to embody a color desired by users.

SUMMARY

Technical Problems

The objective of the present disclosure is to provide a ceramic composition that is harmless to the human body and shows antimicrobial performance simply by adding the ceramic composition without causing a change in the performance and exterior of a base material.

Additionally, the objective of the present disclosure is to provide a ceramic composition that can suppress the growth of various types of microorganisms.

Further, the objective of the present disclosure is to provide a ceramic composition that is harmless to the human body, is environmentally friendly and guarantees price competitiveness.

Aspects according to the present disclosure are not limited to the above ones, and other aspects and advantages that are not mentioned above can be clearly understood from the following description and can be more clearly understood from the embodiments set forth herein. Additionally, understandably, the aspects and advantages in the present disclosure are embodied via means and combinations thereof that are described in the appended claims.

Technical Solutions

A ceramic composition according to the present disclosure exhibits a semi-permanent antimicrobial function without changing the properties of existing materials by adding a certain antimicrobial glass composition to a base glass composition.

Specifically, a composition according to the present disclosure comprises a base glass composition; and an antimicrobial glass composition, and the antimicrobial glass composition comprises 26 to 50 wt % of $SiO_2$, 0.5 to 4 wt % of one or more of $B_2O_3$ and $P_2O_5$, a total of 15 to 27 wt % of $Na_2O$ and $K_2O$, 3 to 20 wt % of one or more of CaO, MgO and $WO_3$, and 22 to 44 wt % of one or more of ZnO and SnO.

Advantageous Effects

A ceramic composition according to the present disclosure can be harmless to the human body and show antimicrobial performance simply by adding the ceramic composition, without causing a change in the performance and exterior of a base material.

Additionally, the ceramic composition according to the present disclosure can suppress the growth of various types of microorganisms.

Further, the ceramic composition according to the present disclosure is harmless to the human body, is environmentally friendly and guarantees price competitiveness.

Specific effects are described along with the above-described effects in the section of detailed description.

DETAILED DESCRIPTION

The above-described aspects, features and advantages are specifically described hereafter with reference to the accompanying drawings such that one having ordinary skill in the art to which the present disclosure pertains can embody the technical idea of the disclosure easily. In the disclosure, detailed description of known technologies in relation to the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

In the disclosure, the singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Hereafter, a ceramic composition according to the present disclosure is described.

<Ceramic Composition>

The ceramic composition according to the present disclosure is a composition comprising a base glass composition that is a base for the composition; and an antimicrobial glass composition that is added to the base glass composition.

In particular, the antimicrobial glass composition comprises 26 to 50 wt % of $SiO_2$, 0.5 to 4 wt % of one or more of $B_2O_3$ and $P_2O_5$, a total of 15 to 27 wt % of $Na_2O$ and $K_2O$, 3 to 20 wt % of one or more of CaO, MgO and $WO_3$, and 22 to 44 wt % of one or more of ZnO and SnO.

The base glass composition is first described. The base glass composition is not limited as long as the base glass composition is a composition based on a ceramic component such as a glass component and the like. An enamel composition or a ceramic glaze may be used as the base glass composition, for example.

Hereafter, the antimicrobial glass composition added to the ceramic composition according to the present disclosure is described.

The most commonly used glass formers comprise $SiO_2$, $B_2O_3$, $P_2O_5$. Glass comprised of large amounts of $B_2O_3$ and $P_2O_5$ exhibits high hygroscopic properties, and a large number of hydroxyl groups (—OH) derived from moisture in the air are adsorbed to the surface of the glass such that the surface of the glass is negatively charged. The negative charge causes deterioration in the antimicrobial activity of the glass.

To prevent this from happening, the present disclosure is to provide a novel silicate-based antimicrobial glass composition in which the addition of $B_2O_3$ and $P_2O_5$ decreases intentionally and which comprises the glass former of $SiO_2$ as a main component.

Antimicrobial glass powders included in the antimicrobial glass composition according to the present disclosure comprise 26 to 50 wt % of $SiO_2$ and 0.5 to 4 wt % of one or more of $B_2O_3$ and $P_2O_5$.

$SiO_2$ is a glass former enabling vitrification, and an essential component serving as the structural skeleton of glass. Additionally, $SiO_2$ does not act as a direct component that exhibits an antimicrobial activity, but forms less OH groups on the surface of the glass than a representative glass former of $P_2O_5$ and helps with the positive charge of the glass surface, caused by a metal ion in the glass.

The component $SiO_2$ may be added at a content ratio of 26 to 50 wt % with respect to 100 wt % of the antimicrobial glass powders according to the present disclosure. If greater than 50 wt % of $SiO_2$ is added, viscosity increases when glass melts. Accordingly, workability and yields may deteriorate during cooling. If less than 26 wt % of $SiO_2$ is added, the structure of glass may be weaken, causing deterioration in water resistance.

Glass comprised of large amounts of $B_2O_3$ and $P_2O_5$ has high hygroscopicity, and a large number of OH groups derived from moisture in the air are adsorbed to the surface of the glass, and the surface of the glass is negatively charged. The negative charge causes deterioration in the antimicrobial activity of the glass. To prevent this from happening, according to the present disclosure, a novel antimicrobial glass composition, in which the addition of $B_2O_3$ and $P_2O_5$ is limited at a maximum level and which comprises the glass former of $SiO_2$ as a main component, has been devised.

That is, $SiO_2$ helps to reinforce the structure of glass, but when used solely as a glass former, the viscosity of the composition becomes too high at a time of melting. Accordingly, a high melting point needs to be satisfied to manufacture uniform glass. To this end, very small amounts of $B_2O_3$ and $P_2O_5$ are added together such that the water resistance of glass may not deteriorate. Thus, the viscosity of a molten material may decrease, and workability and yields in the manufacturing of glass may improve.

Accordingly, the antimicrobial glass powders according to the present disclosure comprise 0.5 to 4 wt % of one or more of $B_2O_3$ and $P_2O_5$.

If greater than 4 wt % of one or more of $B_2O_3$ and $P_2O_5$ is added, the water resistance of glass deteriorates, and a glass element is easily eluted in water. If less than 0.5 wt % of one or more of $B_2O_3$ and $P_2O_5$ is added, workability and yields in the manufacturing of glass may decrease.

Alkali oxides such as $Na_2O$ and $K_2O$ are oxides that serve as mesh modifier that is non-crosslinked in a glass composition. The components cannot be vitrified solely, but when being mixed with a glass former such as $SiO_2$ and $B_2O_3$ and the like at a predetermined ratio, can be vitrified. If only one of the above components is included in the glass composition, the durability of glass may deteriorate in a zone where vitrification is possible. However, if the two components are included together in the glass composition, the durability of glass may improve depending on a ratio. This is referred to as a mixed alkali effect.

Accordingly, a total of 15 to 27 wt % of $Na_2O$ and $K_2O$ is added with respect to 100 wt % of the antimicrobial glass powders according to the present disclosure. If greater than a total of 27 wt % of $Na_2O$ and $K_2O$ is added, thermal properties of a glass composition may deteriorate. If less than a total of 15 wt % of $Na_2O$ and $K_2O$ is added, the valence of a component such as ZnO is hardly controlled, and antimicrobial properties may deteriorate.

Further, the $Na_2O$ content and the $K_2O$ content may satisfy the following formula, for example.

$$0.5 \leq (Na_2O \text{ content})/(K_2O \text{ content}) \leq 1.5 \qquad \text{[Formula]}$$

If the $Na_2O$ content and the $K_2O$ content do not satisfy the above formula, the effect of decreasing a melting point, based on an eutectic point, deteriorates, and the antimicrobial glass composition may hardly be vitrified.

Further, the components $Na_2O$ and $K_2O$ are respectively added at 20 wt % or less, for example.

The antimicrobial glass powders according to the present disclosure comprises 3 to 20 wt % of one or more of CaO, MgO and $WO_3$.

Like an alkali oxide, one or more of CaO, MgO and $WO_3$ are oxides serving as a mesh modifier that is non-crosslinked in a glass composition. If greater than 20 wt % of one or more of CaO, MgO and $WO_3$ is added, the thermal properties of a glass composition may deteriorate. On the contrary, if less than 3 wt % of one or more of CaO, MgO and $WO_3$ is added, the valence of a component such as ZnO is hardly controlled, and antimicrobial properties may deteriorate.

The antimicrobial glass powders according to the present disclosure comprise one or more of ZnO and SnO as a component showing antimicrobial performance.

One or more of ZnO and SnO is included at 22 to 44 wt % with respect to 100 wt % of the antimicrobial glass powders according to the present disclosure. If less than 22 wt % of one or more of ZnO and SnO is added, the antimicrobial properties of a glass composition are hardly ensured. On the contrary, if greater than 44 wt % of one or more of ZnO and SnO is added, the durability or thermal properties of a glass composition may deteriorate. For example, 30 wt % or greater of ZnO may be added.

An antimicrobial composition of the related art comprises various types of antimicrobial components such as Ag, Ag oxides and the like, to exhibit antimicrobial activities (coverage of various types of germs). However, the long-term exposure to light of a product to which the Ag component is applied causes a color change. According to the present disclosure, instead of Ag and Ag oxides, Zn and Sn are used for the exhibition of antimicrobial activities, thereby suppressing the adverse effects described above. If possible, the antimicrobial glass composition according to the present disclosure does not comprise Ag and. Ag oxides. However, when necessary, 0.1 wt % or less of $Ag_3PO_4$ or $AgNO_3$ may be included with respect to 100 wt % of the antimicrobial glass powders.

Hereafter, a manufacturing method of an antimicrobial glass composition according to the present disclosure is described.

The manufacturing method of an antimicrobial glass composition in the embodiment of the present disclosure comprises mixing, melting, cooling and grinding.

Mixing

The mixing step involves manufacturing antimicrobial glass powders comprising 26 to 50 wt % of $SiO_2$, 0.5 to 4 wt % of one or more of $B_2O_3$ and $P_2O_5$, a total of 15 to 27 wt % of $Na_2O$ and $K_2O$, 3 to 20 wt % of one or more of CaO, MgO and $WO_3$, and 22 to 44 wt % of one or more of ZnO and SnO.

A preferable composition ratio of the antimicrobial glass powders is described above.

Melting

The melting step involves melting the antimicrobial glass powders.

In this step, melting is performed at 1,100 to 1,400° C. for 1 to 60 minutes, for example. If the melting point is less than 1,200° C. or the melting period is less than 1 minute, the antimicrobial glass powders do not melt completely, and the unmixing of a glass molten material occurs. On the contrary, if the melting point is greater than 1,300° C. or the melting period is greater than 60 minutes. Excessive energy and time consumption occur.

Cooling

The cooling step involves cooling the melted antimicrobial glass powders up to room temperature.

In this step, cooling is performed using a cooling-in-furnace method, for example. When air cooling or water cooling is applied, antimicrobial glass may have high internal stress, and in some cases, has a crack. To prevent this from happening, cooling can be furnace cooling, for example.

Grinding

The grinding step involves grinding the cooled antimicrobial glass. At this time, a dry type grinder is preferred. The dry type grinder may be used in the ball milling process and jet milling process, for example. In the grinding step, a silane coupling agent is added to the antimicrobial glass powders.

In the above-described grinding step, the antimicrobial glass is ground finely, and the antimicrobial glass composition comprising the antimicrobial glass powders and the silane coupling agent is manufactured. The antimicrobial glass composition, for example, has an average diameter of 30 μm or less, and preferably, an average diameter range from 15 to 25 μm.

In the above-described processes, the antimicrobial glass composition in the embodiment of the present disclosure may be manufactured.

The antimicrobial glass composition (or an antimicrobial glass frit) manufactured as described above is added to a base glass composition, to finally manufacture a ceramic composition.

The ceramic composition according to the present disclosure may comprise 90 to 99 wt % of the base glass composition and 1 to 10 wt % of the antimicrobial glass composition to minimize the deformation of the exterior of a final product and maximize the antimicrobial performance of the final product. If less than 1 wt % of the antimicrobial glass composition is added, antimicrobial performance may deteriorate, and if greater than 10 wt % of the antimicrobial glass composition is added, the durability or wear resistance and the like of a final product may deteriorate.

Embodiments

Hereafter, the features and effects of the subject matter of the present disclosure are described specifically with reference to preferred embodiments. However, the embodiments are provided as preferred examples and are not construed as limiting the subject matter of the disclosure in any aspects.

Details, which can be technically inferred by one skilled in the art, are not included herein and omitted.

1. Manufacturing of Antimicrobial Glass Composition

Embodiments and Comparative Examples

An antimicrobial glass composition having composition, listed in table 1, melted in an electric furnace at 1,250° C. and then cooled on a stainless steel sheet in a glass bulk form with an air cooling method to obtain cullet-shaped antimicrobial glass. Then 0.5 wt % of a slime coupling agent was added to the antimicrobial glass with respect to 100 wt % of the entire composition, was ground by a dry type ball mill and passed through a 400 mesh sieve to manufacture antimicrobial glass powders having a D90 average particle size of 20 μm.

Herein, $Na_2CO_3$, $K_2CO_3$ and $CaCO_3$ were respectively used as a raw material for $Na_2O$, $K_2O$ and CaO, and except for the components, the remaining components are listed in table 1.

TABLE 1

| | | | | | | | | | |
|---|---|---|---|---|---|---|---|---|---|
| | | | | (Unit: wt %) | | | | | |
| Components | Embodiment 1 | Embodiment 2 | Embodiment 3 | Embodiment 4 | Embodiment 5 | Embodiment 6 | Comparative example 1 | Comparative example 2 | Comparative example 3 |
| SiO2 | 35.1 | 35.1 | 35.1 | 35.1 | 35.1 | 35.1 | 35.1 | 53 | 35.1 |
| P2O5 | 1.8 | 1.8 | 0 | 0 | 0 | 0 | 1.8 | 4 | 0 |
| B2O3 | 0 | 0 | 2 | 2 | 2 | 5.8 | 0 | 0 | 6.8 |
| Na2O | 9.6 | 9.6 | 9.6 | 9.6 | 9.6 | 5.6 | 9.6 | 15 | 10.7 |
| K2O | 9.6 | 9.6 | 9.6 | 9.6 | 9.6 | 9.6 | 9.6 | | 5.9 |
| WO3 | 0 | 0 | 0 | 0 | 0 | 0 | 0 | 0 | 0 |
| CaO | 8.8 | 8.8 | 4.4 | 4.4 | 4.4 | 8.8 | 8.8 | 18 | 9.8 |

TABLE 1-continued (Unit: wt %)

| Components | Embodiment 1 | Embodiment 2 | Embodiment 3 | Embodiment 4 | Embodiment 5 | Embodiment 6 | Comparative example 1 | Comparative example 2 | Comparative example 3 |
|---|---|---|---|---|---|---|---|---|---|
| MnO2 | 0 | 0 | 0 | 0 | 0 | 0 | 0 | 0 | 12.2 |
| SnO | 2 | 2 | 0 | 0 | 0 | 0 | 2 | 0 | 0 |
| ZnO | 33.1 | 33.1 | 39.3 | 39.3 | 39.3 | 35.1 | 33.1 | 10 | 19.5 |
| MgO | 35.1 | 35.1 | 35.1 | 35.1 | 35.1 | 35.1 | 35.1 | 53 | 35.1 |
| Total | 100 | 100 | 100 | 100 | 100 | 100 | 100 | 100 | 100 |

2. Manufacturing of Samples

Embodiments and Comparative Examples

The antimicrobial glass powders manufactured as described above was mixed with an enamel composition, using a 3D powder mixer, to manufacture a mixture. At this time, a slight amount of a silane coupling agent was added to the mixture for dry coating.

An ordinary enamel composition available on the market was used as the enamel composition used in the embodiments and the comparative examples of the present disclosure.

The mixture was sprayed on a low-carbon steel sheet with a corona discharge gun. The voltage of the discharge gun was controlled to 40 kV to 100 kV, and after the spray, the low-carbon steel sheet was burned at 830 to 870° C. for 5 to 10 minutes to manufacture enamel samples in the embodiments and comparative examples.

Table 2 hereafter shows whether each sample was vitrified and shows the amount of the antimicrobial glass powders added to each sample.

TABLE 2

| Category | Embodiment 1 | Embodiment 2 | Embodiment 3 | Embodiment 4 | Embodiment 5 | Embodiment 6 | Comparative example 1 | Comparative example 2 | Comparative example 3 |
|---|---|---|---|---|---|---|---|---|---|
| Vitrification | 35.1 | 35.1 | 35.1 | 35.1 | 35.1 | 35.1 | 35.1 | 53 | 35.1 |
| Added amount (wt %) | 1.8 | 1.8 | 0 | 0 | 0 | 0 | 1.8 | 4 | 0 |

3. Evaluation of Antimicrobial Performance of Samples

Table 3 shows results of the measurement of the antimicrobial performance of samples manufactured in embodiments and comparative examples. At this time, to see the antimicrobial activity of each sample, the standard antimicrobial test JIS Z 2801 (the film attachment method) was used to measure antimicrobial activation levels against *Staphylococcus aureus* and *Escherichia coli*. Additionally, each sample's antimicrobial activity against *Streptococcus pneumoniae* and *Pseudomonas aeruginosa* were additionally measured.

Herein, the antimicrobial activation levels were evaluated using the following calculation method.

| Antimicrobial activation levels | Antimicrobial activity |
|---|---|
| 2.0 or greater | 99.0% |
| 3.0 or greater | 99.9% |
| 4.0 or greater | 99.99% |

TABLE 3

| | Category | Embodiment 1 | Embodiment 2 | Embodiment 3 | Embodiment 4 | Embodiment 5 | Embodiment 6 | Comparative example 1 | Comparative example 2 | Comparative example 3 |
|---|---|---|---|---|---|---|---|---|---|---|
| Antimicrobial activity (JIS Z 2801, Film attachment method) | *S. aureus* | 99.9% | 99.99% | 99.99% | 99.99% | 99.99% | 99.99% | 99.0 | 2.0 or less | 2.0 or less |
| | *E. coli* | 99.9% | 99.99% | 99.99% | 99.99% | 99.99% | 99.99% | 99.0 | 2.0 or less | 2.0 or less |
| | *S. pneumoniae* | 99.9% | 99.99% | 99.99% | 99.99% | 99.999% | 99.99% | 2.0 or less | 2.0 or less | 2.0 or less |
| | *P. aeruginosa* | 99.0% | 99.9% | 99.9% | 99.99% | 99.99% | 99.99% | 2.0 or less | 2.0 or less | 2.0 or less |

As shown in table 3, all the samples manufactured in the embodiments have an antimicrobial activation level of 4.0 or greater, and an antimicrobial activity of 99.99%.

Some of the samples in the comparative examples show an antimicrobial activation level of less than 2.0 and an antimicrobial activity of less than 99%.

For reference, the sample of comparative example 1 does not exhibit a sufficient antimicrobial activity against *Streptococcus pneumoniae* or *Pseudomonas aeruginosa* since it includes a very small amount of the antimicrobial glass composition.

The results of the test reveal that the samples manufactured in the embodiments exhibit a more excellent antimicrobial activity than the sample manufactured in the comparative examples.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the scope of the disclosure though not explicitly described in the description of the embodiments.

What is claimed is:

1. A ceramic composition, comprising:
a base glass composition; and
an antimicrobial glass composition consisting of:
26 to 50 wt % of $SiO_2$,
0.5 to 4 wt % of one or more of $B_2O_3$ and $P_2O_5$,
a total of 15 to 27 wt % of $Na_2O$ and $K_2O$,
3 to 20 wt % of one or more of CaO, MgO and $WO_3$, and
22 to 44 wt % of one or more of ZnO and SnO.

2. The ceramic composition of claim 1, wherein a ratio of wt % of the $Na_2O$ to wt % of the $K_2O$ in the antimicrobial glass composition is greater than or equal to 0.5 and less than or equal to 1.5.

3. The ceramic composition of claim 1 wherein each of the $Na_2O$ and the $K_2O$ is added at 20 wt % or less.

4. The ceramic composition of claim 1, wherein the ZnO is added at 30 wt % or greater.

5. The ceramic composition of claim 1, wherein the ceramic composition comprises 90 to 99 wt % of the base glass composition, and 1 to 10 wt % of the antimicrobial glass composition.

6. The ceramic composition of claim 1, wherein the base glass composition is an enamel composition or a ceramic glaze.

7. The ceramic composition of claim 1, wherein the antimicrobial glass composition contains both the ZnO and the SnO.

8. A ceramic composition, comprising:
a base glass composition; and
an antimicrobial glass composition consisting of:
26 to 50 wt % of $SiO_2$,
0.5 to 4 wt % of one or more of $B_2O_3$ and $P_2O_5$,
a total of 15 to 27 wt % of $Na_2O$ and $K_2O$,
3 to 20 wt % of one or more of CaO, MgO and $WO_3$,
22 to 44 wt % of one or more of ZnO and SnO, and
0.1 wt % or less of Ag or an oxide comprising Ag.

* * * * *